Patented Oct. 30, 1934

1,978,551

UNITED STATES PATENT OFFICE 1,978,551

METHOD OF MANUFACTURING HYDROGEN PEROXIDE

Mahlon J. Rentschler, Willoughby, Ohio, assignor of one-half to William R. Jeavons, Cleveland Heights, Ohio No Drawing. Application June 22, 1931, Serial No. 546,158

3 Claims. (Cl. 23—207)

This invention relates to the manufacture of hydrogen peroxide from barium peroxide, and has for its general objects to overcome serious difficulties which have existed heretofore in such manufacture; to obtain a more concentrated solution of hydrogen peroxide than has been obtainable heretofore by such manufacture; to effect a material saving of time in the production of hydrogen peroxide from barium peroxide; and to obtain valuable by-products as a result of my new mode of manufacture.

Heretofore, in the manufacture of hydrogen peroxide from barium peroxide, it has been the universal practice to dissolve the barium peroxide in dilute mineral acids, such as phosphoric acid, muriatic acid, or a mixture of both of these acids; to precipitate the barium sulphate by the addition of sulphuric acid to the solution, and then to separate the insoluble barium sulphate from the hydrogen peroxide solution by filtration. The principal difficulties which are encountered in carrying out the foregoing operation are due to the refractory or gritty nature of the barium peroxide. The latter material is manufactured by peroxidizing barium monoxide at approximately 900° F. and, as barium monoxide itself is produced at high temperatures, the resultant barium peroxide is often in a partly fused condition and is also somewhat clinkered, this condition being generally augmented by the presence of small amounts of silica and alumina in the barium peroxide, which causes a partial fusion and sintering together of the product so that, even though the barium peroxide thus obtained is finely powdered, portions of it are soluble with difficulty in dilute acids. Since barium peroxide always contains a percentage of unconverted barium monoxide, many manufacturers prefer to hydrate the barium peroxide with hot water before attempting to dissolve it in dilute acids. This operation has the effect of slacking any traces of unconverted barium monoxide, converting such traces into barium hydrate and thus to some extent breaking up the clinkered particles and at the same time hydrating the barium peroxide, in which form it is softer and more readily soluble in acids. However, the hydration of barium peroxide in hot water has to be accomplished with great care, as barium peroxide loses oxygen in the presence of moisture at temperatures as low as 120° F.; consequently complete hydration is impossible without serious loss of oxygen, and the more refractory particles pass through the hydration process in an unaltered condition.

Whether the barium peroxide, produced as described hereinbefore, has been hydrated or not, it is introduced into a vat containing dilute mineral acid, or a mixture of both af the acids mentioned, thereby to dissolve the barium peroxide and produce hydrogen peroxide. The vat is usually equipped with devices for cooling the bath therein as well as for agitating the latter, because the reaction is endothermic, and excessive heat causes decomposition of hydrogen peroxide. Experience shows that, in bringing the barium peroxide into solution, it is necessary at all times that the batch shall show an acid reaction, since hydrogen peroxide in an alkaline condition decomposes rapidly, with a resultant loss of oxygen and of economy in operation. In order to control the reaction of batches, some manufacturers mix definite quantities of barium peroxide and acid, using an excessive quantity of acid over that demanded by the reaction, while others alternate the addition of the acid and the barium peroxide to the vat, taking care that the reaction shall always be acid by using some indicator, such as litmus, phenol phthalein, methyl orange, etc., thus making the process continuous in effect. In recent years considerable success in carrying out this reaction has been obtained by the use, as the indicator, of some form of hydrogen ion concentration-determinating apparatus. In this connection, it should be noted that it is important that the use of too much free acid must be avoided, as concentrated acids cause a decomposition of barium peroxide, wherein oxygen, instead of hydrogen peroxide, is produced. Regardless of the methods heretofore employed for dissolving the barium peroxide in acid, and in spite of the use of the most diversified means for agitating the batch, some of the undissolved refractory particles of barium peroxide are likely to cause a local change in reaction to an alkaline condition, which results in forming an unstable brown or yellow-colored barium compound, presumably barium tetroxide, which decomposes spontaneously with explosive violence and consequent loss of active oxygen. When barium peroxide is dissolved and the resultant solution is acid in reaction, the hydrogen peroxide solution formed contains most of the impurities originally present in the barium peroxide. These impurities render such solution of hydrogen peroxide very unstable and they should be removed before the peroxide is bottled or shipped. If this should not be done, the peroxide will not keep; by reason of the impurities therein, oxygen will be liberated spontaneously, thus rendering the product worthless.

Even when the production of hydrogen peroxide in the manner explained is attended with proper care and with the use of barium peroxide possessing the purity referred to, it has been found impracticable to obtain hydrogen peroxide having a concentration above 6 percent or 20 volumes.

I have discovered a method whereby the foregoing objections can be overcome and whereby the barium peroxide can be readily and completely dissolved and all objectionable impurities that may remain in the batch containing the hydrogen peroxide will be found in the barium precipitate and can be readily removed from the hydrogen peroxide by the usual method of filtration and with the production of hydrogen peroxide having a much higher concentration than is obtainable by the process described hereinbefore.

In carrying out my process, definite proportions of the normally alkaline barium peroxide and the acid or mixture of acids are brought into reaction in a glass or tin-lined tank provided with a suitable agitator and a suitable cooling device.

In practice, I prefer to place in the tank about one-third of the theoretical quantity of acid necessary to dissolve the batch of barium peroxide, the acid being diluted with sufficient water to avoid liberation of oxygen while the reaction between the acid and the barium peroxide is occurring. The dry powdered barium is then added slowly to the acid, avoiding any sudden rise of temperature above 80° F. Additional quantities of acid and barium peroxide are added from time to time until the entire batch is thoroughly mixed with acid and cooled to a temperature below 70° F. At this point, it will be found that a considerable proportion of the barium peroxide will remain undissolved, and the further solution of the undissolved particles is ordinarily an exceedingly slow and laborious operation. In order to facilitate a complete solution of such undissolved particles, I pass the batch into or through an agate or porcelain mortar, pebble mill, wet pan, suitably arranged rolls, or other apparatus which is capable of rubbing or grinding together the undissolved particles, under properly cooled conditions, until all such particles are completely dissolved. I prefer a form of apparatus into which the reacting ingredients of the batch can be fed in definite proportions, thereby to secure a continuous operation. I have found that, under these conditions, the most refractory or gritty particles of barium peroxide are speedily disintegrated and dissolved, thus avoiding any possible local change in acidity or alkalinity and resulting in a uniform product of the highest quality, while the yield of hydrogen peroxide is practically quantitative, the hydrogen peroxide solution thus produced possessing a much higher degree of concentration than that obtained by the ordinary method of obtaining hydrogen peroxide from barium peroxide. In fact, it is possible by any process to produce hydrogen peroxide possessing a concentration above 15 percent or 50 volumes.

In practicing my process, it is necessary that the grinding or rubbing of the undissolved particles shall be carried out in the presence of acid. By so doing, new surfaces of the particles are constantly brought into reaction with the acid, resulting in a decomposition of the barium peroxide without loss of active oxygen. I have found further that this method of operation greatly reduces the time necessary for the complete reaction between the barium peroxide and the acid, which is a very important factor in the commercial production of hydrogen peroxide.

Since the reaction of the finished batch is acid and since the said batch contains all of the impurities in solution, it is necessary, before filtering, to make it alkaline, thereby to render insoluble the iron, alumina and silica, as well as other impurities. I render the batch only slightly alkaline, as indicated by a sensitive indicator, preferably using for the alkaline re-agent a saturated solution of barium hydrate. I then render the batch slightly acid, by the addition of a small amount of phosphoric or other suitable acid, after which I render the batch again slightly alkaline by the use of the barium hydrate solution—alternating the alkalinity and acidity of the batch several times. Finally, when all of the impurities have been rendered insoluble, the batch should be in a slightly acid condition, adding acid to the batch for this purpose, if necessary. The batch is then filtered immediately, in order to separate the pure hydrogen peroxide solution from the resultant barium compounds and other impurities which have been rendered insoluble by the alkaline reagent in the manner just described.

In the foregoing treatment of the so-called finished batch, I have found that alternating the reaction from slightly acid to slightly alkaline and back to slightly acid a number of times is very essential, because under these conditions the impurities are precipitated as basic salts, which renders their complete removal by filtration possible without the employment of a re-action so strongly alkaline as to cause a decomposition of the hydrogen peroxide. After the final treatment, the batch is so slightly acid that it may, if desired, be pumped through iron pipes prior to filtration without any deleterious effect on the hydrogen peroxide or the equipment.

Furthermore, the final finishing operation of alternating the batch from acidity to alkalinity and from alkalinity to acidity a number of times determines the character of the precipitate. If phosphoric acid is used, the precipitate will consist largely of di-barium phosphate, which is a valuable by-product. However, should sulphuric acid be employed, the precipitate will consist largely of barium sulphate. Thus it will be seen that the character of the precipitate may be determined by the kind of acid used.

Having thus described my invention, what I claim is:

1. The method of manufacturing hydrogen peroxide which consists in treating barium peroxide with dilute mineral acid while maintaining the batch cool, subjecting the undissolved particles to attrition in acid solution and then treating the resulting batch several times alternately with just sufficient barium hydrate and an acid of the group consisting of sulphuric and phosphoric to render the same alternately slightly alkaline and slightly acid, the final condition being slightly acid and then filtering off the insoluble material from the batch.

2. The step in the process of making hydrogen peroxide from barium peroxide which consists in rendering the batch containing the hydrogen peroxide and impurities, several times, alternately, slightly alkaline and slightly acid by the use of barium hydrate and an acid of the group consisting of sulphuric and phosphoric acids, the final condition being slightly acid.

3. The method of manufacturing hydrogen peroxide which consists in treating barium peroxide with dilute mineral acid while maintaining the batch cool, subjecting the undissolved particles to attrition in acid solution, rendering the resulting batch several times alternately slightly acid by the addition of dilute mineral acid and slightly alkaline by the addition of barium hydrate, the final condition being slightly acid, and then promptly filtering off the insoluble material from the batch.

MAHLON J. RENTSCHLER.